(12) United States Patent
Lou et al.

(10) Patent No.: US 12,332,474 B2
(45) Date of Patent: Jun. 17, 2025

(54) DISPLAY DEVICE AND MANUFACTURING METHOD THEREOF

(71) Applicant: WUHAN CHINA STAR OPTOELECTRONICS TECHNOLOGY CO., LTD., Hubei (CN)

(72) Inventors: Tengfei Lou, Hubei (CN); Yuanyuan Ren, Hubei (CN); Xiaokun Chen, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/623,787

(22) PCT Filed: Dec. 23, 2021

(86) PCT No.: PCT/CN2021/140956
§ 371 (c)(1),
(2) Date: Jun. 29, 2023

(87) PCT Pub. No.: WO2023/115478
PCT Pub. Date: Jun. 29, 2023

(65) Prior Publication Data
US 2024/0045136 A1 Feb. 8, 2024

(30) Foreign Application Priority Data
Dec. 21, 2021 (CN) .......................... 202111569480.X

(51) Int. Cl.
*F21V 8/00* (2006.01)
*G02F 1/1335* (2006.01)

(52) U.S. Cl.
CPC ..... *G02B 6/0086* (2013.01); *G02F 1/133516* (2013.01); *G02F 2202/28* (2013.01)

(58) Field of Classification Search
CPC ................ G02B 6/0086; G02F 1/1333; G02F 1/133509; G02F 1/133516; G02F 1/133528; G02F 1/133608
(Continued)

(56) References Cited

U.S. PATENT DOCUMENTS

2007/0006500 A1    1/2007  Major et al.
2009/0002607 A1*   1/2009  Kubota ................. G02F 1/1333
                                                        349/96
(Continued)

FOREIGN PATENT DOCUMENTS

CN    102608779 A    7/2012
CN    103486480 A    1/2014
(Continued)

OTHER PUBLICATIONS

Chinese Office Action issued in corresponding Chinese Patent Application No. 202111569480.X dated Apr. 24, 2023, pp. 1-9.
(Continued)

Primary Examiner — Thomas M Sember
(74) Attorney, Agent, or Firm — PV IP PC; Wei Te Chung

(57) ABSTRACT

A display device and a manufacturing method thereof are disclosed. The display device includes a backlight module, a display panel, an edge cover adhesive attached to a periphery of the backlight module and extending to a surface of a side of the display panel away from the backlight module. The display panel includes an array substrate, a color filter substrate, and a first polarizing layer disposed on the color filter substrate. The color filter substrate includes a first recess formed on at least one side of the color filter
(Continued)

substrate close to an edge of the color filter substrate and away from the array substrate. A first end portion of the edge cover adhesive is disposed in the first recess. The first polarizing layer covers at least part of the edge cover adhesive.

20 Claims, 13 Drawing Sheets

(58) Field of Classification Search
USPC .............................. 362/97.1, 97.2, 97.3, 97.4
See application file for complete search history.

(56) References Cited

U.S. PATENT DOCUMENTS

| | | | | |
|---|---|---|---|---|
| 2012/0162565 | A1* | 6/2012 | Lee | G02F 1/133308 |
| | | | | 349/62 |
| 2015/0168784 | A1 | 6/2015 | Asada | |
| 2019/0384105 | A1* | 12/2019 | Zhou | G02F 1/133528 |

FOREIGN PATENT DOCUMENTS

| | | | |
|---|---|---|---|
| CN | 104991302 | A | 10/2015 |
| CN | 105137635 | A | 12/2015 |
| CN | 105759474 | A | 7/2016 |
| CN | 106773293 | A | 5/2017 |
| CN | 206991655 | U | 2/2018 |
| CN | 109031756 | A | 12/2018 |
| CN | 109459883 | A | 3/2019 |
| CN | 109633969 | A | 4/2019 |
| CN | 212675313 | U | 3/2021 |
| CN | 212749474 | U | 3/2021 |
| CN | 212905808 | U | 4/2021 |
| CN | 113138498 | A | 7/2021 |
| CN | 113433725 | A | 9/2021 |
| CN | 113625488 | A | 11/2021 |
| CN | 214669945 | U | 11/2021 |
| EP | 3477621 | A1 | 5/2019 |
| JP | 2009157140 | A | 7/2009 |
| TW | I714416 | B | 12/2020 |
| WO | 2021003640 | A1 | 1/2021 |

OTHER PUBLICATIONS

International Search Report in International application No. PCT/CN2021/140956,mailed on Sep. 14, 2022.
Written Opinion of the International Search Authority in International application No. PCT/CN2021/140956,mailed on Sep. 14, 2022.

* cited by examiner

DISPLAY DEVICE AND MANUFACTURING METHOD THEREOF

FIELD

The present disclosure relates to a field of display, and more particularly, to a display device and a manufacturing method thereof.

BACKGROUND

Liquid crystal display (LCD) devices include a display panel and a backlight module. An edge cover adhesive is attached to a periphery of the display panel and a periphery of the backlight module, thereby protecting them. Therefore, risk of separation between the display panel and the backlight module can be reduced, and light leakage at a periphery of the display devices is also reduced. As an edge frame of display devices becomes narrower and narrower, an area where an edge cover adhesive can be attached become smaller and smaller. As such, risk of edge cover tapes being warped during reliability tests and applications is increased, deteriorating a protective performance of edge cover adhesives.

Thus, it is necessary to provide a display device and a manufacturing method thereof to solve the above technical issue.

SUMMARY

The present disclosure provides a display device and a manufacturing method thereof, which can solve a following technical issue: protective performance of conventional edge cover adhesives is deteriorated due to edge cover tapes being warped.

To solve the above issues, technical solutions provided by the present disclosure are described as follows:

an embodiment of the present disclosure provides a display device, comprising:
 a backlight module;
 a display panel disposed on a backlight module, wherein the display panel comprises an array substrate, a color filter substrate disposed on a side of the array substrate away from the backlight module, and a first polarizing layer disposed on the color filter substrate; and
 an edge cover adhesive attached to a periphery of the backlight module and extending to a surface of a side of the display panel away from the backlight module;
 wherein the color filter substrate comprises a first recess defined on at least one side of the color filter substrate close to an edge of the color filter substrate and away from the array substrate, a first end portion of the edge cover adhesive is disposed in the first recess, and the first polarizing layer covers at least part of the edge cover adhesive.

Preferably, the first polarizing layer overlaps the color filter substrate along a top view direction of the display device.

Preferably, the backlight module comprises a back frame comprising a containing cavity, and the display panel is embedded into the containing cavity; and wherein the edge cover adhesive is attached to the back frame, and the first polarizing layer is overlappingly connected to the edge cover adhesive and the back frame.

Preferably, along a direction from an edge of the color filter substrate to a center of the color filter substrate, a depth of the first recess is increasingly increased, and a thickness of the edge cover adhesive is increasingly increased.

Preferably, the color filter substrate comprises a second recess defined on a side of the color filter substrate away from an edge of the color filter substrate, a depth of the second recess is greater than a depth of the first recess, the first recess is communicatively connected to the second recess, and the edge cover adhesive is filled in the first recess and the second recess.

Preferably, the color filter substrate comprises a plurality of third recesses defined in the first recess, and a protrusion is formed between two adjacent third recesses.

Preferably, the edge cover adhesive is filled in the first recess and the third recesses.

Preferably, along a top view direction of the display device, along a direction from an edge of the color filter substrate to a center of the color filter substrate, the first recess at least comprises a first part having an increasingly increased opening size, and the edge cover adhesive is filled in the first part.

Preferably, along the direction from the edge of the color filter substrate to the center of the color filter substrate, the first recess comprises a second part having an increasingly reduced opening size, the second part is communicatively connected to the first part and is defined on a side of the first part close to an edge of the color filter substrate, and the edge cover adhesive is filled in the first part and the second part.

Preferably, the edge cover adhesive comprises a first bonding layer, a main body layer disposed on the first bonding layer, a second bonding layer disposed on the main body layer, and a functional layer disposed on the second bonding layer.

An embodiment of the present disclosure further provides a method of manufacturing a display device, comprising following steps:
 providing an array substrate;
 forming a color filter substrate on the array substrate;
 forming a first recess on at least one side of the color filter substrate close to an edge of the color filter substrate and away from the array substrate;
 providing an edge cover material adhesive, wherein the edge cover material adhesive comprises an edge cover adhesive and a release film disposed on the edge cover adhesive, and the release film exposes a first end portion of the edge cover adhesive;
 attaching the exposed first end portion of the edge cover material adhesive to an interior of the first recess;
 forming a first polarizing layer on the color filter substrate and the edge cover adhesive;
 forming a backlight module on a side of the array substrate away from the first polarizing layer;
 removing the release film; and
 attaching the edge cover adhesive to a periphery of the backlight module.

Preferably, the first polarizing layer overlaps the color filter substrate along a top view direction of the display device.

Preferably, the step of forming the backlight module on the side of the array substrate away from the first polarizing layer comprises a following step: forming the backlight module having a back frame having a containing cavity on a side of the array substrate away from the first polarizing layer; and wherein the edge cover adhesive is attached to the back frame, and the first polarizing layer is overlappingly connected to the edge cover adhesive and the back frame.

Preferably, the step of forming the first recess on at least one side of the color filter substrate close to the edge of the color filter substrate and away from the array substrate comprises a following step: forming the first recess having an increasing increased depth on at least one side of along a direction from an edge of the color filter substrate to a center of the color filter substrate, the color filter substrate close to the edge of the color filter substrate and away from the array substrate.

Preferably, the step of forming the first recess on at least one side of the color filter substrate close to the edge of the color filter substrate and away from the array substrate comprises a following step: along a direction from an edge of the color filter substrate to a center of the color filter substrate, forming the first recess on at least one side of the color filter substrate close to the edge of the color filter substrate and away from the array substrate, and forming a second recess communicatively connected to the first recess on a side of the color filter substrate away from the edge of the color filter substrate; wherein a depth of the second recess is greater than a depth of the first recess.

Preferably, the step of forming the first recess on at least one side of the color filter substrate close to the edge of the color filter substrate and away from the array substrate comprises a following step: along a direction from an edge of the color filter substrate to a center of the color filter substrate, forming the first recess on at least one side of the color filter substrate close to the edge of the color filter substrate and away from the array substrate, and forming a plurality of third recesses in the first recess, wherein a protrusion is formed between two adjacent third recesses.

Preferably, the edge cover adhesive is filled in the first recess and the third recesses.

Preferably, the step of forming the first recess on at least one side of the color filter substrate close to the edge of the color filter substrate and away from the array substrate comprises a following step: along a top view direction of the display device, along a direction from an edge of the color filter substrate to a center of the color filter substrate, forming the first recess having a first part having an increasingly increased opening size on at least one side of the color filter substrate close to the edge of the color filter substrate and away from the array substrate; wherein the edge cover adhesive is filled in the first part.

Preferably, the step of forming the first recess on at least one side of the color filter substrate close to the edge of the color filter substrate and away from the array substrate comprises a following step: along a top view direction of the display device, along a direction from an edge of the color filter substrate to a center of the color filter substrate, forming the first recess having a first part having an increasingly increased opening size and a second part having an increasingly reduced opening size on at least one side of the color filter substrate close to the edge of the color filter substrate and away from the array substrate, wherein the first part is communicatively connected to the first part; and wherein the second part is disposed on a side of the first part close to the edge of the color filter substrate, and the edge cover adhesive is filled in the first part and the second part.

Preferably, the edge cover adhesive comprises a first bonding layer, a main body layer disposed in the first bonding layer, a second bonding layer disposed in the main body layer, and a functional layer disposed on the second bonding layer.

Regarding the beneficial effects:

In the present disclosure, an edge cover adhesive is attached to an interior of a first recess on an edge of a color filter substrate. The edge cover adhesive is compressed by the color filter substrate and a first polariz-ing layer, thereby reducing risk of the edge cover adhesive being warped. As such, protective performance of the edge cover adhesive is improved, light leakage of display devices is reduced, and a lifespan of the display devices is extended.

DETAILED DESCRIPTION

A display device and a manufacturing method thereof of the present disclosure are described below in detail with reference to accompanying drawings to make objectives, technical solutions, and effects of the present disclosure clearer and easier to be understood. It should be noted that described embodiments are merely used to construct the present disclosure and are not intended to limit the present disclosure.

Embodiments of the present disclosure provide a display device and a manufacturing thereof which are respectively described below in detail. It should be noted that a following description order of the embodiments does not mean a preferred description order of the embodiments.

Figure 1:
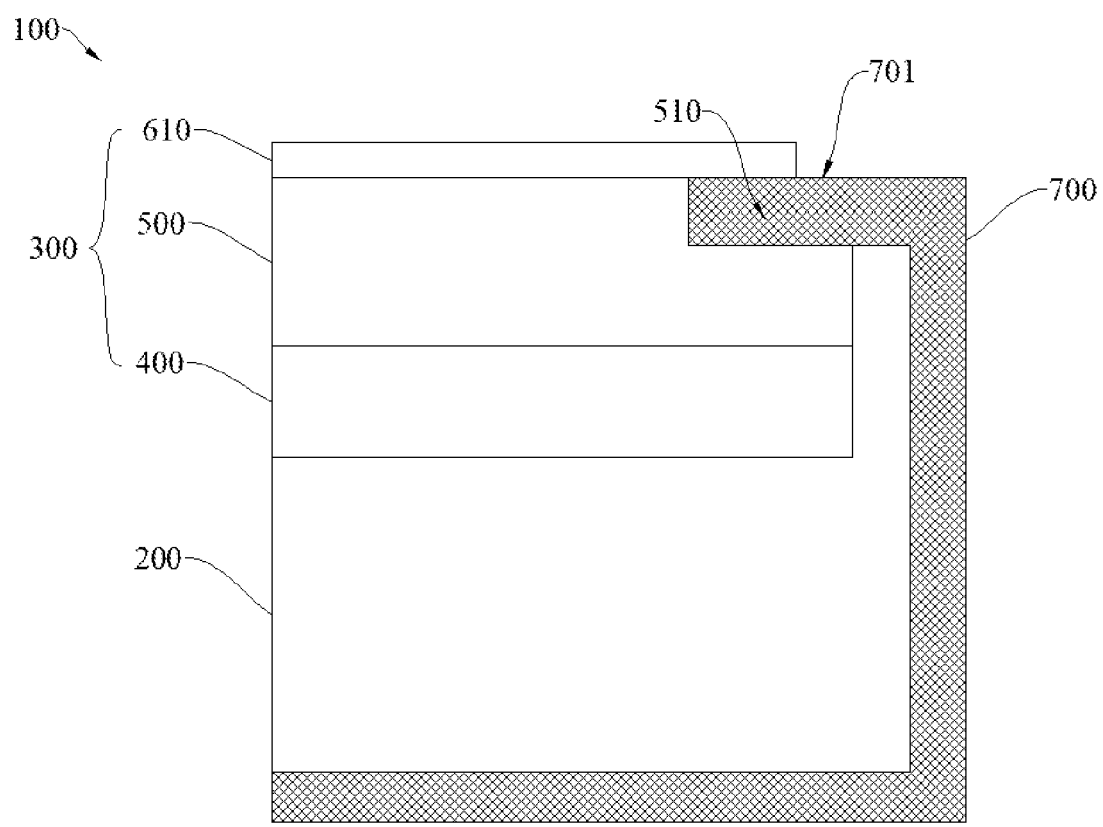
FIG. 1 is a structural schematic view showing a first structure of a display device provided by an embodiment of the present disclosure.

Please refer to FIG. 1, an embodiment of the present disclosure provides a display device 100, including:
 a backlight module 200;
 a display panel 300 disposed on the backlight module 200. The display panel 300 includes an array substrate 400, a color filter substrate 500 disposed on a side of the array substrate 400 away from the backlight module 200 and away from the array substrate 400, a first polarizing layer 610 disposed on the color filter substrate 500; and an edge cover adhesive 700 attached to a periphery of the backlight module 200 and extends to a surface of a side of the display panel 300 away from the backlight module 200.

The color filter substrate 500 includes a first recess 510 defined on at least one side of an edge of the color filter substrate 500, and a first end portion 701 of the edge cover adhesive 700 is located in the first recess 510. The first polarizing layer 610 covers at least part of the edge cover adhesive 700.

In the present disclosure, an edge cover adhesive is attached to an interior of a first recess on an edge of a color filter substrate. The edge cover adhesive is compressed by the color filter substrate and a first polarizing layer, thereby reducing risk of the edge cover adhesive being warped. As such, protective performance of the edge cover adhesive is improved, light leakage of display devices is reduced, and a lifespan of the display devices is extended.

Technical solutions of the present application are described in conjunction with specific embodiments.

In the present embodiment, please refer to FIG. 1, the display device 100 includes the backlight module 200, the display panel 300 disposed on the backlight module 200, and the edge cover adhesive 700. The edge cover adhesive 700 is attached to the periphery of the backlight module 200 and extends to the surface of the side of the display panel 300 away from the backlight module 200.

In the present embodiment, please refer to FIG. 1, the display panel 300 includes the array substrate 400, the color filter substrate 500 disposed on the side of the array substrate 400 away from the backlight module 200, and the first polarizing layer 610 disposed on the color filter substrate 500

In some embodiments, please refer to FIG. 1, the color filter substrate 500 includes the first recess 510 defined on at least one side of the color filter substrate 500 close to the edge of the color filter substrate 500 and away from the array substrate 400. The first end portion 701 of the edge cover adhesive 700 is located in the first recess 510. The first polarizing layer 610 covers at least part of the edge cover adhesive 700.

In conventional display devices, as an edge frame of display devices becomes narrower and narrower, an area where an edge cover adhesive can be attached to become smaller and smaller. As such, risk of edge cover tapes being warped during reliability tests and applications is increased. In the present disclosure, the edge cover adhesive 700 is attached to the first recess 510 on the edge of the color filter substrate 500. The edge cover adhesive 700 is compressed by the color filter substrate 500 and the first polarizing layer 610, thereby forming a sandwich structure. The first recess 510 can improve flatness of the first polarizing layer 610, thereby reducing risk of the edge cover adhesive 700 being warped and improving protective performance of the edge cover adhesive 700. Therefore, light leakage of the display device 100 is reduced, and a lifespan of the display device 100 is extended.

In some embodiments, please refer to FIG. 1, the edge cover adhesive 700 located in the first recess 510 has a same depth as the first recess 510. The edge cover adhesive 700 located in the recess 510 is fully in contact with the first polarizing layer 610. Two sides of the edge cover adhesive 700 are adhesive, which can strengthen an adhesive force of attachment.

In some embodiments, along a top view direction of the display device 100, the first polarizing layer 610 overlaps the color filter substrate 500. Please refer to FIG. 2, the first polarizing layer 610 extends to the edge of the color filter substrate 500. An edge of the first polarizing layer 610 overlaps the edge of the color filter substrate 500. The first polarizing layer 610 having a light-polarizing effect can be fully in contact with the edge cover adhesive 700 in the first recess 510, thereby increasing a contact area between the edge cover adhesive 700 and the first polarizing layer 610 to enhance adhesion between the edge cover adhesive 700 and the first polarizing layer 610. Therefore, risk of the edge cover adhesive 700 being warped is further reduced, protective performance of the edge cover adhesive 700 is improved, light leakage of the display device 100 is reduced, and a life span of the display device 100 is extended.

Figure 2:
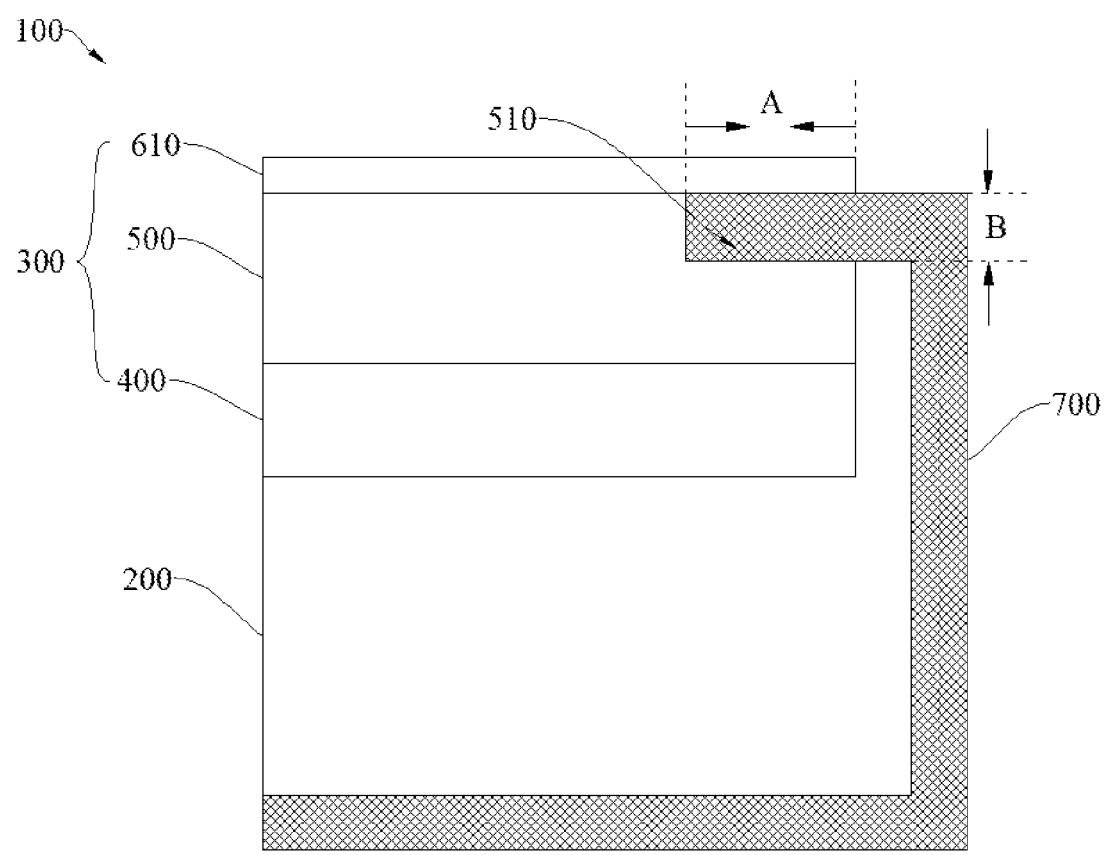
FIG. 2 is a structural schematic view showing a second structure of a display device provided by an embodiment of the present disclosure.

In some embodiments, please refer to FIG. 2, along a direction from the edge of the color filter substrate 500 to a center of the color filter substrate 500, a width of the first recess 510 is represented by A, and A may be greater than or equal to 0.3 mm, thereby further reducing risk of the edge cover adhesive 700 being warped. A thickness of the edge cover adhesive 700 is represented by B, and B can range from 0.03 mm to 0.07 mm (preferably 0.05 mm). A depth of the first recess 510 can be adjusted adaptively according to the thickness B of the edge cover adhesive 700.

Figure 3:
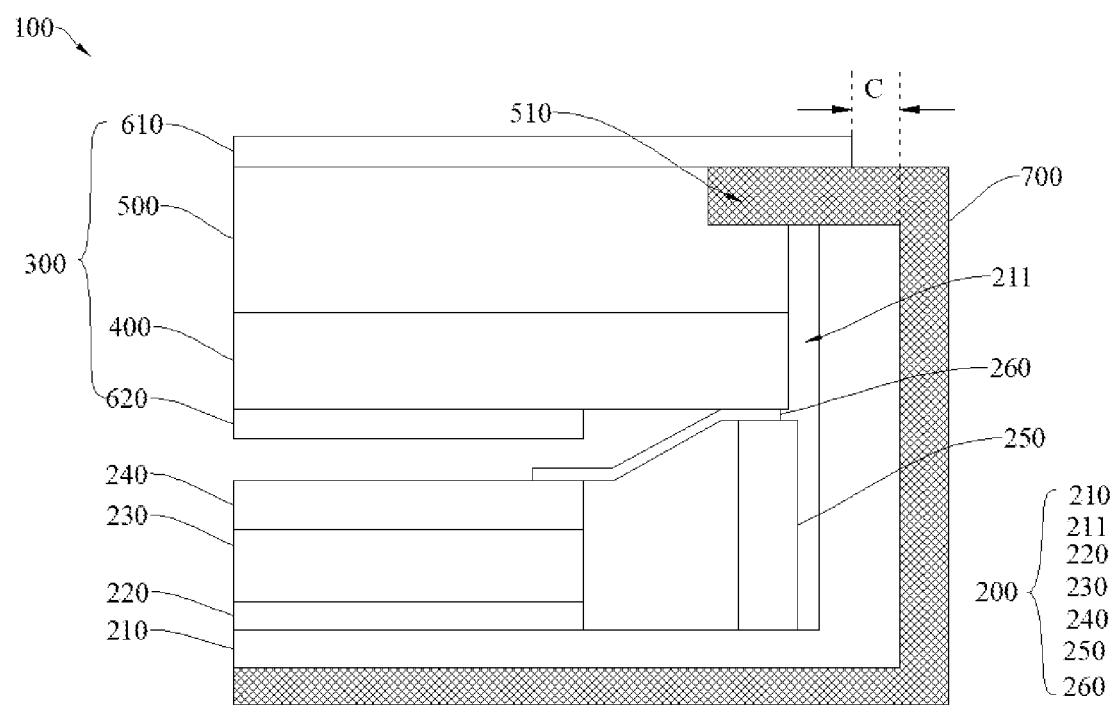
FIG. 3 is a structural schematic view showing a third structure of a display device provided by an embodiment of the present disclosure.

In some embodiments, please refer to FIG. 3, the backlight module 200 includes a back frame 210 having a containing cavity 211. The display panel 300 is embedded in the containing cavity 211. The edge cover adhesive 700 is attached to the back frame 210. The first polarizing layer 610 is overlappingly connected to the edge cover adhesive 700 and the back frame 210.

The first polarizing layer 610 extends to an edge of the display device 100, and is overlapping connected to the back frame 210 and the edge cover adhesive 700, thereby further increasing a contact area between edge cover adhesive 700 and the first polarizing layer 610. Therefore, adhesion between the edge cover adhesive 700 and the first polarizing layer 610 is enhanced, and risk of the edge cover adhesive 700 being warped is reduced, protective performance of the edge cover adhesive 700 is enhanced, light leakage of the display device 100 is reduced, and a lifespan of the display device 100 is extended.

In some embodiments, please refer to FIG. 3, a distance between a surface of a side of the first polarizing layer 610 away from a center of the display device 100 and a surface of a side of the back frame 210 away from a center of the display device 100 is represented by C, and C can be greater than or equal to 0. That is, the first polarizing layer 610 outward extends farthest to a surface of a side of the back frame 210 away from a center of the display device 100. The first polarizing layer 610 covers at least part of the edge cover adhesive 700, thereby reducing risk of the edge cover adhesive 700 being warped.

Figure 4:
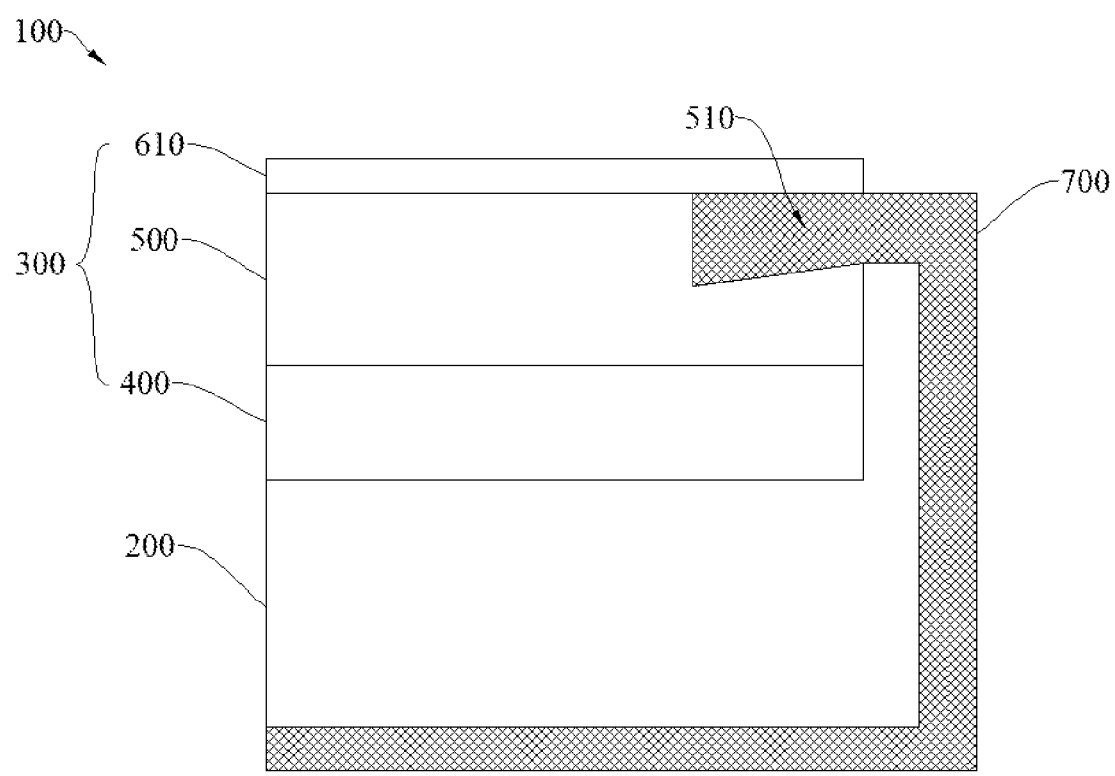
FIG. 4 is a partly structural schematic view showing a fourth structure of a display device provided by an embodiment of the present disclosure.

In some embodiments, please refer to FIG. 4, along the direction from the edge of the color filter substrate 500 to the center of the color filter substrate 500, a depth of the first recess 510 is increasingly increased, and a thickness of the edge cover adhesive 700 is increasingly increased.

The edge cover adhesive 700 is filled in the first recess 510. When the edge cover adhesive 700 is subjected to external forces and tends to be extruded out, the first recess 510 having the increasingly increased depth, the edge cover adhesive 700 having the increasingly increased thickness, and the first polarizing layer 610 form a wedge-shaped structure. When the edge cover adhesive 700 tends to be extruded out from the first recess 510, an extrusion force of the first polarizing layer 610 and color filter substrate 500 applied to the edge cover adhesive 700 is increased, thereby reducing risk of the edge cover adhesive 700 being extruded out. Therefore, performance of the edge cover adhesive 700 is enhanced, light leakage of the display device 100 is reduced, and a lifespan of the display device 100 is extended.

Figure 5:
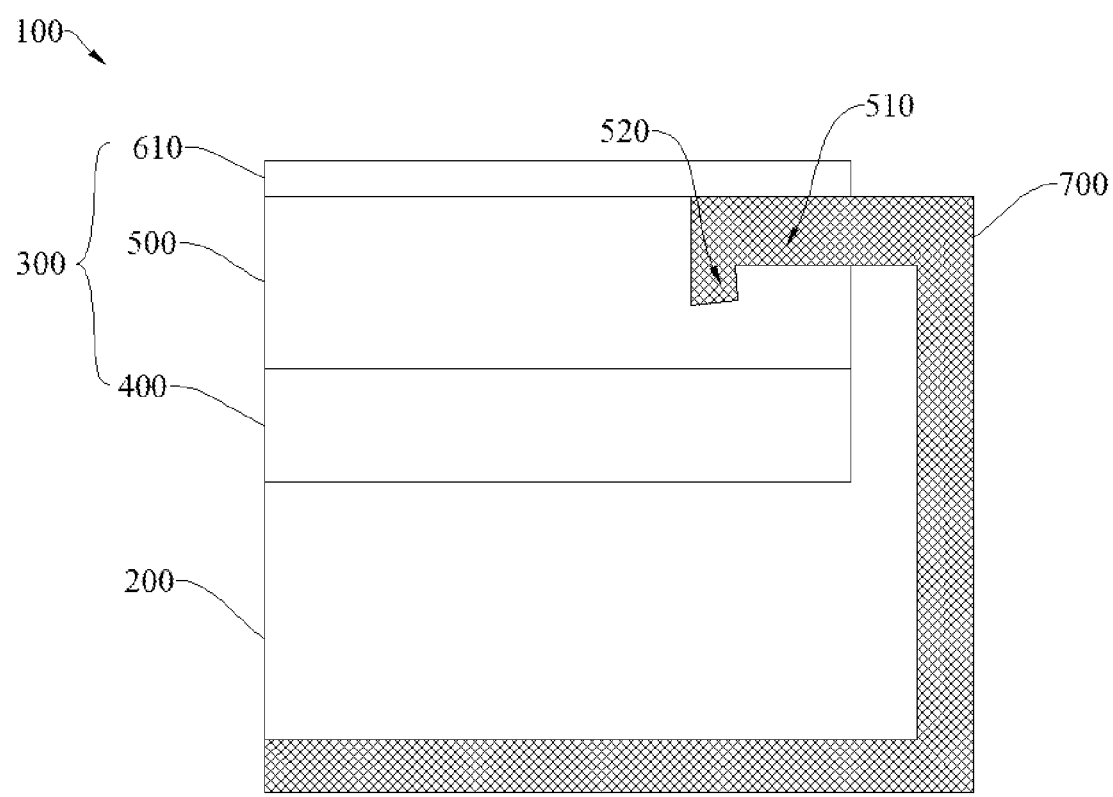
FIG. 5 is a partly structural schematic view showing a fifth structure of a display device provided by an embodiment of the present disclosure.

In some embodiments, please refer to FIG. 5, the color filter substrate 500 further includes a second recess 520 located on a side of the color filter substrate 500 away from the edge of the color filter substrate 500. A depth of the second recess 520 is greater than the depth of the first recess 510. The first recess 510 and the second recess 520 are communicatively connected. The edge cover adhesive 700 is filled in the first recess 510 and the second recess 520.

The depth of the second recess 520 is greater than the depth of the first recess 510. The edge cover adhesive 700 filled in the second recess 520 is like an anchor. When the edge cover adhesive 700 tends to be moved outside the first recess 510, the edge cover adhesive 700 located in the second recess 520 can achieve an anchor function, thereby reducing risk of the edge cover adhesive 700 being extruded out. Therefore, protective performance of the edge cover adhesive 700 is enhanced, light leakage of the display device 100 is reduced, and a lifespan of the display device 100 is extended.

Figure 6:
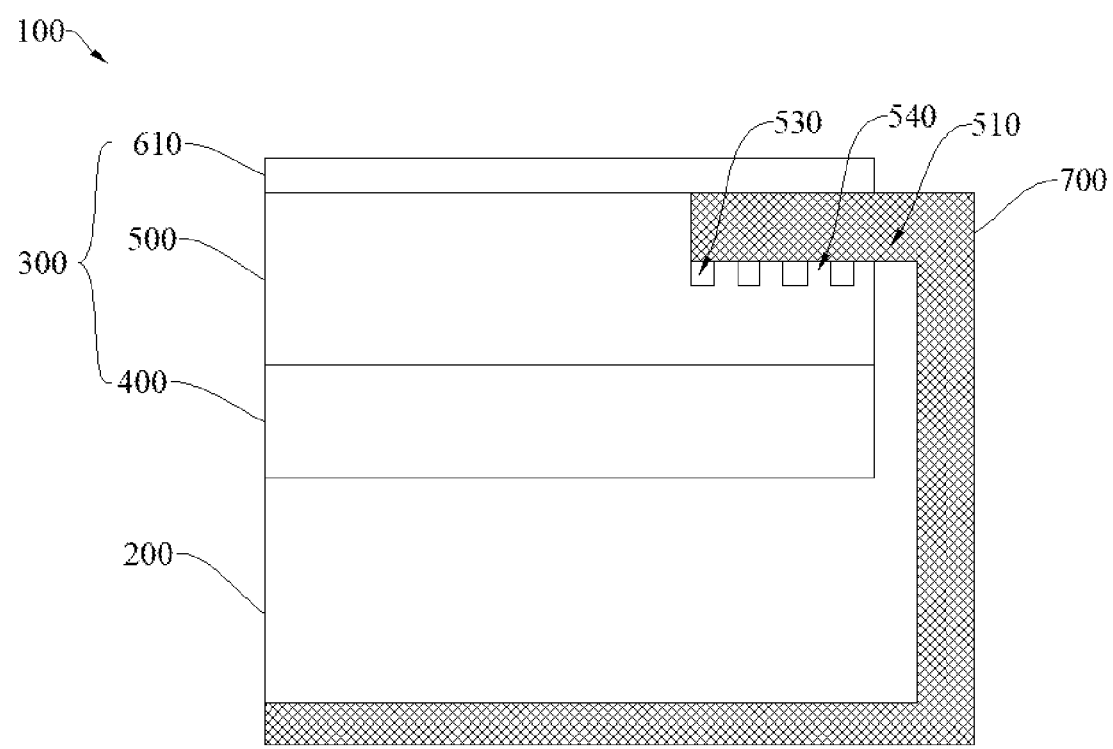
FIG. 6 is a partly structural schematic view showing a sixth structure of a display device provided by an embodiment of the present disclosure.

In some embodiments, please refer to FIG. 6, the color filter substrate 500 further includes a plurality of third recesses 530 located in the first recess 510. A protrusion 540 is formed between two adjacent third recesses 530.

The third recesses 530 are defined in the first recess 510. The plurality of protrusions 540 are formed between two adjacent third recesses 530, thereby increasing friction of the edge cover adhesive 700 located in the first recess 510. When the edge cover adhesive 700 tends to be moved out from the first recess 510, risk of the edge cover adhesive 700 being extruded out is reduced. Therefore, protective performance of the edge cover adhesive 700 is enhanced, light leakage of the display device 100 is reduced, and a lifespan of the display device 100 is extended.

Figure 7:
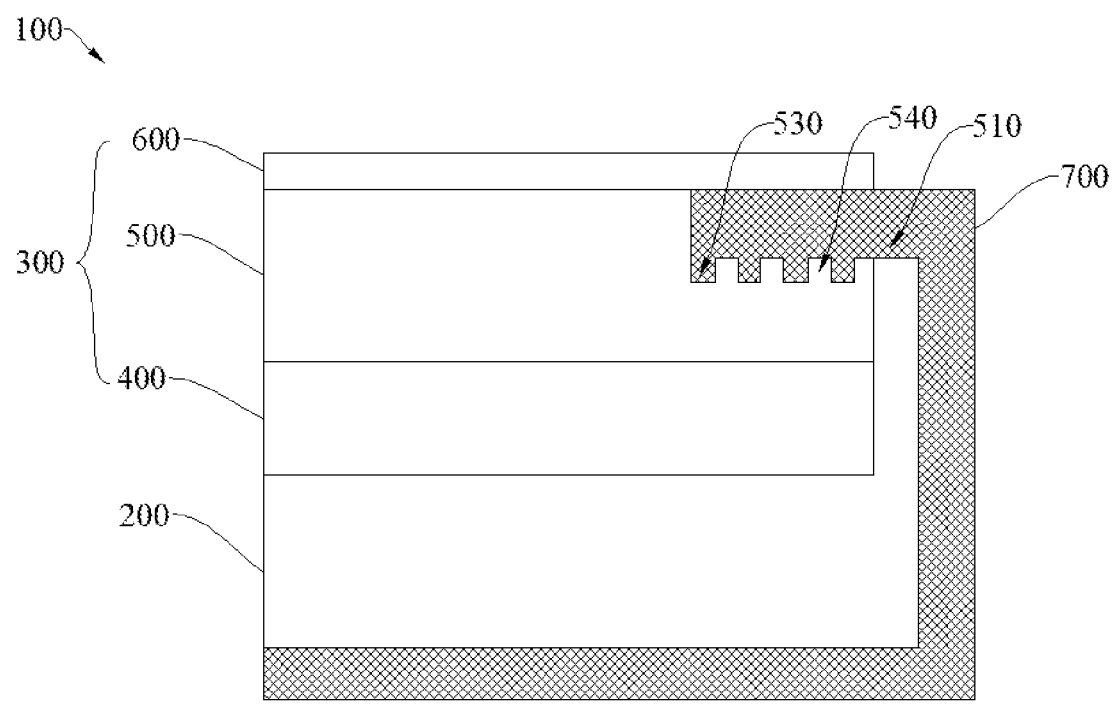
FIG. 7 is a partly structural schematic view showing a seventh structure of a display device provided by an embodiment of the present disclosure.

In some embodiments, please refer to FIG. 7, the edge cover adhesive 700 is filled in the first recess 510 and the third recesses 530. A material of the edge cover adhesive 700 may include a material with good filling properties. The edge cover adhesive 700 may be filled in the third recesses 530, thereby further increasing viscosity between the edge cover adhesive 700 and the color film substrate 500. When the edge cover adhesive 700 tends to be moved out from the first recess 510, risk of the edge cover adhesive 700 being extruded out is reduced. Therefore, protective performance of the edge cover adhesive 700 is enhanced, light leakage of the display device 100 is reduced, and a lifespan of the display device 100 is extended.

In some embodiments, the edge cover adhesive 700 includes a first bonding layer, a main body layer disposed on the first bonding layer, a second bonding layer disposed on the main body layer, and a functional layer disposed on the second bonding layer. A material of the main body layer can be one or more of aluminum foil, copper foil, and wave absorbing materials. The wave absorbing materials can be soft magnetic metal powder and resin. The functional layer can be polyethylene terephthalate (resin) or metal Mylar. A thickness of each stacked layer can be adjusted according to actual requirements.

Figure 8:
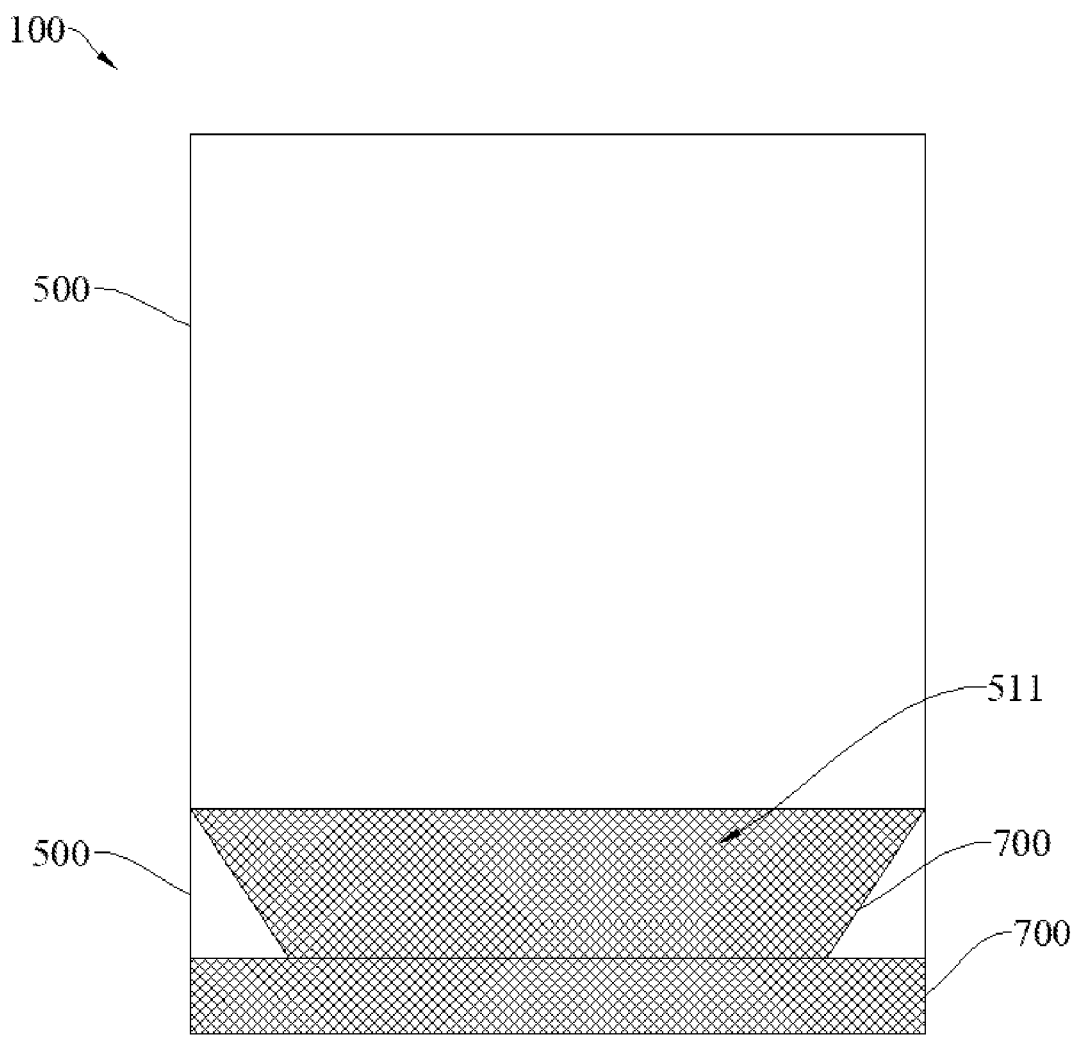
FIG. 8 is a schematic top view showing an eighth structure of a display device provided by an embodiment of the present disclosure.

In some embodiments, please refer to FIG. 8, along the top view direction of the display device 100 and along the direction from the edge of the color filter substrate 500 to the center of the color filter substrate 500, the first recess 510 at least includes a first part 511 having an increasingly increased opening size. The edge cover adhesive 700 is filled in the first part 511.

The opening size of the first recess 510 is optimized. Along the direction from the edge of the color filter substrate 500 to the center of the color filter substrate 500, the opening size of the first part 511 is increasingly increased. The edge cover adhesive 700 is filled in the first part 511. Two sides of the first part 511 are in contact with the edge cover adhesive 700. The first part 511 and the edge cover adhesive 700 also form a wedge-shaped structure. When the edge cover adhesive 700 tends to be moved out from the first recess 510, a pressing force of the two sides of the first part 511 applied to the edge cover adhesive 700 is increased, thereby reducing risk of the edge cover adhesive 700 being extruded out. Therefore, protective performance of the edge cover adhesive 700 is enhanced, light leakage of the display device 100 is reduced, and a lifespan of the display device 100 is extended.

Figure 9:
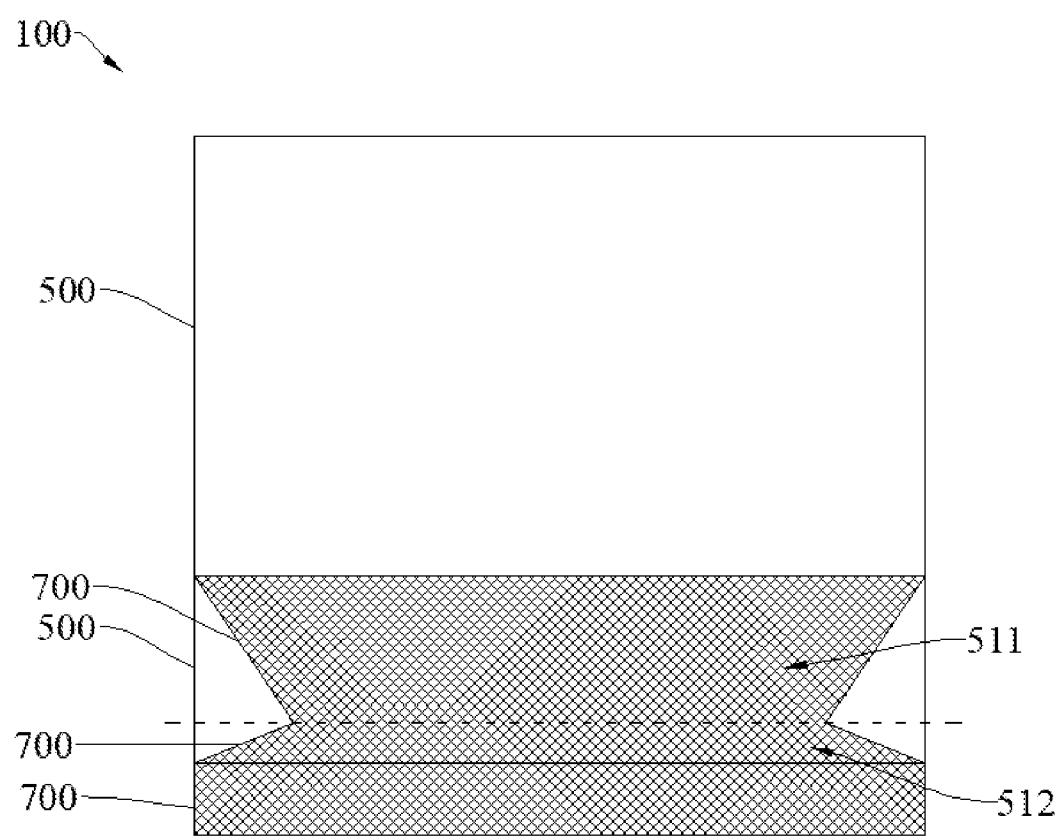
FIG. 9 is a schematic top view showing a ninth structure of a display device provided by an embodiment of the present disclosure.

In some embodiments, please refer to FIG. 9, along the direction from the edge of the color filter substrate 500 to the center of the color filter substrate 500, the first recess 510 further includes a second part 512 having an increasingly decreased opening size. The second part 512 is communicatively connected to the first part 511. The second part 512 is located on a side of the first part 511 close to the edge of the color filter substrate 500. The edge cover adhesive 700 is filled in the first part 511 and the second part 512.

In FIG. 9, the dotted line is only used to facilitate a distinction between a recess pattern of the first part 511 and a recess patter of the second part 512. The first part 511 and the edge cover adhesive 700 also form a wedge-shaped structure. The second part 512 and the first part 511 form a bidirectional fixation, thereby further reducing risk of the edge cover adhesive 700 being extruded out. In addition, a width of the edge cover adhesive 700 is reduced because of the first part 511, and a width of the edge cover adhesive 700 is increased because of the second part 512. Therefore, an edge cover effect of the edge cover adhesive 700 is improved. As such, light leakage of the display device 100 is reduced, and a lifespan of the display device 100 is extended.

In some embodiments, a thickness of the edge cover adhesive 700 located in the first recess 510 is less than a thickness of the edge cover adhesive 700 located outside the first recess 510. The edge cover adhesive 700 in the first recess 510 is compressed by the first polarizing layer 610 to a certain degree. Therefore, adhesion between the first polarizing layer 610 and the edge cover adhesive 700 and adhesion between the color filter substrate 500 and the edge cover adhesive 700 are increased. As such, protective performance of the edge cover adhesive 700 is enhanced, light leakage of the display device 100 is reduced, and a lifespan of the display device 100 is extended.

In some embodiments, the display device 100 includes a display area and a non-display area disposed on a periphery of the display area. The color filter substrate 500 includes a plurality of color photoresists and a plurality of light-shading units located in the display area. The light-shading units are disposed between two adjacent color photoresists. The color photoresists are any one of a red photoresist, a green photoresist, or a blue photoresist.

In some embodiments, the color filter substrate 500 further includes a first glass located in the display area and the non-display area. The first glass supports the color photoresists and the light-shielding units. The first recess 510, the second recess 520, and the third recesses 530 are all disposed on the first glass. The first glass facilitates a manufacturing process of recesses. of the recess, The manufacturing process of recesses is simple and has low cost.

In some embodiments, the display panel 300 further includes a liquid crystal layer located between the color filter substrate 500 and the array substrate 400.

In some embodiments, the display panel 300 further includes a second polarizing layer 620 located on a side of the liquid crystal layer away from the first polarizing layer 610. The second polarizing layer 620 may be disposed between the liquid crystal layer and the array substrates 400. Also, the second polarizing layer 620 may be disposed on a side of the array substrate 400 away from the second polarizing layer 620.

In some embodiments, please refer to FIG. 3, the backlight module 200 further includes a reflective plate 220 disposed on a side of the backlight module 200 away from the display panel 300, a light guide plate 230 and a plurality of light-emitting units disposed on the reflective plate 220, and an optical film layer 240 disposed on the light guide plate 230. The optical film layer 240 is used to improve optical performance such as improving a light-transmitting performance of layers. The light-emitting units may be edge-type light-emitting units or direct-type light-emitting units, which is not specifically limited here.

In some embodiments, referring to FIG. 3, the backlight module 200 further includes a connector connecting the backlight module 200 with the display panel 300. The connector is located in the backlight module 200 and is close to an edge. The connector includes a support unit 250 and an air bonding 260. The air bonding 260 is located on the support unit 250 and can connect the optical film layer 240 with the array substrate 400 of the display panel 300.

In some embodiments, please refer to FIG. 3, the connector, the reflective plate 220, the light guide plate 230, the light-emitting units, and the optical module are all located in the containing cavity 211 of the back frame 210.

In some embodiments, the array substrate 400 includes an active layer disposed on the substrate, a first insulating layer disposed on the active layer, a gate layer disposed on the first insulating layer, a second insulating layer disposed on the gate layer, a source and drain layer disposed on the second insulating layer, and a third insulating layer disposed on the source and drain layer.

In the present disclosure, an edge cover adhesive is attached to an interior of a first recess on an edge of a color filter substrate. The edge cover adhesive is compressed by the color filter substrate and a first polarizing layer, thereby reducing risk of the edge cover adhesive being warped. As such, protective performance of the edge cover adhesive is improved, light leakage of display devices is reduced, and a lifespan of the display devices is extended.

Figure 10:
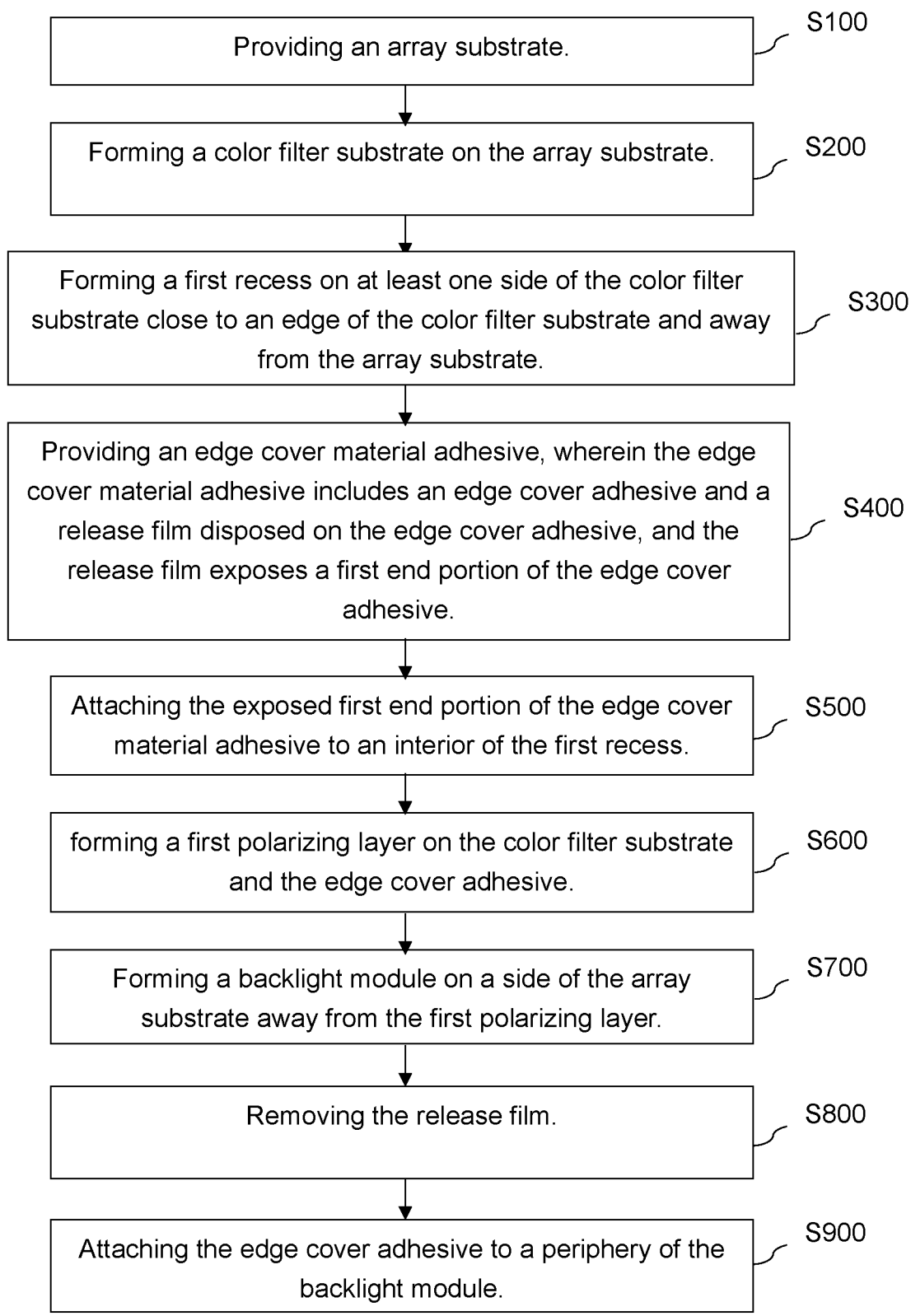
FIG. 10 is a schematic flowchart showing steps of a method of manufacturing a display device provided by an embodiment of the present disclosure.

Please refer to FIG. 10, an embodiment of the present disclosure further provides a method of manufacturing a display device 100, including following steps:

S100, providing an array substrate 400;

S200, forming a color filter substrate 500 on the array substrate 400;

S300, forming a first recess 510 on at least one side of the color filter substrate 500 close to an edge of the color filter substrate 500 and away from the array substrate 400;

S400, providing an edge cover material adhesive 710, wherein the edge cover material adhesive 710 includes an edge cover adhesive 700 and a release film 720 disposed on the edge cover adhesive 700, and the release film 720 exposes a first end portion 701 of the edge cover adhesive 700;

S500. attaching the exposed first end portion 701 of the edge cover material adhesive 710 to an interior of the first recess 510;

S600, forming a first polarizing layer 610 on the color filter substrate 500 and the edge cover adhesive 700;

S700, forming a backlight module 200 on a side of the array substrate 400 away from the first polarizing layer 610;

S800, removing the release film 720;

S900, attaching the edge cover adhesive 700 to a periphery of the backlight module 200.

In the present disclosure, an edge cover adhesive is attached to an interior of a first recess on an edge of a color filter substrate. The edge cover adhesive is compressed by the color filter substrate and a first polarizing layer, thereby reducing risk of the edge cover adhesive being warped. As such, protective performance of the edge cover adhesive is improved, light leakage of display devices is reduced, and a lifespan of the display devices is extended.

Technical solutions of the present disclosure are described in conjunction with specific embodiments.

Figure 11A:
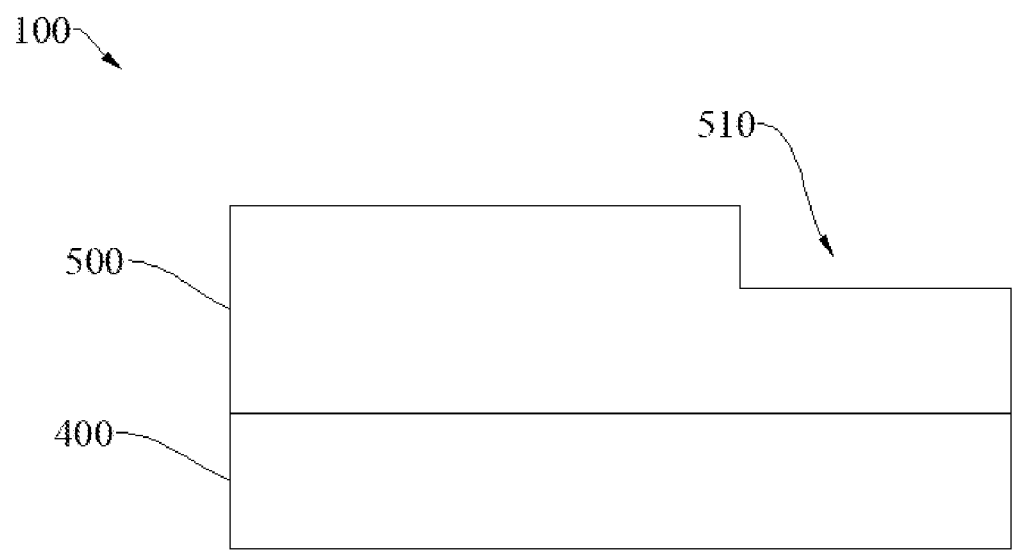
FIG. 11A to FIG. 11D are schematic flowcharts showing the method of manufacturing the display device provided by the embodiment of the present disclosure.
Figure 11B:
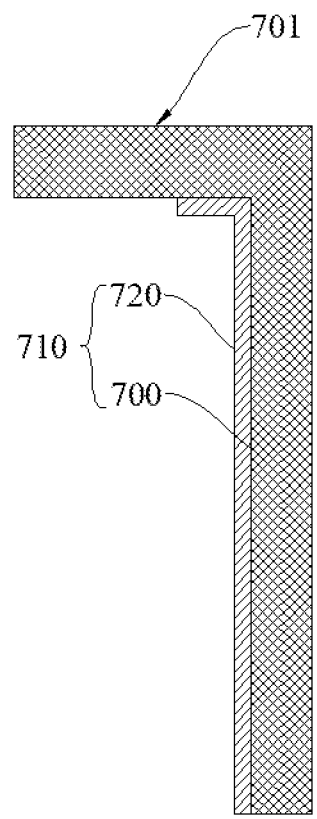

In the present embodiment, a manufacturing method of a display device 100 includes following steps:

S100. providing an array substrate 400, please refer to FIG. 11A.

In some embodiments, a specific structure of the array substrate 400 can be referred the array substrate 400 of the above-mentioned embodiments, and is not described here again.

S200, forming a color filter substrate 500 on the array substrate 400, please refer to FIG. 11A.

In some embodiments, the step S200 includes:

S210, forming a first glass on the array substrate 400.

S220, forming a plurality of color photoresists and a plurality of light-shading units on the first glass.

In some embodiments, the light-shading units is disposed between two adjacent color photoresists, and the color photoresists are any one of a red photoresist, a green photoresist, and a blue photoresist.

S300, forming a first recess 510 on at least one side of the color filter substrate 500 close to an edge of the color filter substrate 500 and away from
the array substrate 400, please refer to FIG. 11A.

In some embodiments, to adjust a shape or a number of the first recess 510, the step S300 may include the following types:

S300a, along a direction from the edge of the color filter substrate 500 to a center of the color filter substrate 500, forming the first recess 510 having an increasingly increased depth on at least one side of the color filter substrate 500 close to the edge of the color filter substrate 500 and away from the array substrate 400, please refer to FIG. 4

The edge cover adhesive 700 is filled in the first recess 510. When the edge cover adhesive 700 is subjected to external force and tends to be moved out, the first recess 510 having the increasingly increased depth, the edge cover adhesive 700 having an increasingly increased thickness, and the first polarizing layer 610 form a wedge-shaped structure.

S300b, along the direction from the edge of the color filter substrate 500 to the center of the color filter substrate 500, forming the first recess 510 having an increasingly increased depth and a second recess 520 communicatively connected to the first recess on at least one side of the color filter substrate 500 close to the edge of the color filter substrate 500 and away from the array substrate 400, wherein a depth of the second recess 520 is greater than the depth of the first recess 510, please refer to FIG. 5.

The depth of the second recess 520 is greater than the depth of the first recess 510, and the edge cover adhesive 700 is filled in the second recess 520 as an anchor.

S300c, along the direction from the edge of the color filter substrate 500 to the center of the color filter substrate 500, forming a first recess 510 on at least one side of the color filter substrate 500 close to the edge of the color filter substrate 500 and away from the array substrate 400, and forming a plurality of third recesses 530 in the first recess 510, wherein a protrusion 540 is formed between two adjacent third recesses 530, please refer to FIG. 6.

In some embodiments, please refer to FIG. 7, the edge cover adhesive 700 is filled in the first recess 510 and the third recess 530.

S300d, along a top view direction of the display device 100 and along the direction from the edge of the color filter substrate 500 to the center of the color filter substrate 500, forming the first recess 510 having a first part 511 having an increasingly increased opening size on at least one side of the color filter substrate 500 close to the edge of the color filter substrate 500 and away from the array substrate 400, please refer to FIG. 8.

The opening size of the first recess 510 is optimized. Along the direction from the edge of the color filter substrate 500 to the center of the color filter substrate 500, the opening size of the first portion 511 is increasingly increased. The edge cover adhesive 700 is filled in the first part 511. Two sides of the first part 511 are in contact with the edge cover adhesive 700. The first part 511 and the edge cover adhesive 700 also form a wedge-shaped structure.

S300e, along a top view direction of the display device 100 and along the direction from the edge of the color filter substrate 500 to the center of the color filter substrate 500, forming the first recess 510 having the first part 511 having the increasingly increased opening size and having a second part 512 having an increasingly reduced opening size on at least one side of the color filter substrate 500 close to the edge of the color filter substrate 500 and away from the array substrate 400, please refer to FIG. 9.

The edge cover adhesive 700 is filled in the first part 511 and the second part 512. The first part 511 and the second part 512 form a recess pattern. The first part 511 and the edge cover adhesive 700 also form a wedge-shaped structure, thereby reducing risk of the edge cover adhesive 700 being extruded out. In addition, a width of the edge cover adhesive 700 is reduced because of the first part 511, and a width of the edge cover adhesive 700 is increased because of the second part 512. Therefore, an edge cover effect of the edge cover adhesive 700 is improved. As such, light leakage of the display device 100 is reduced, and a lifespan of the display device 100 is extended.

In some embodiments, the step S300 includes following steps:

S310, forming the first recess 510 on at least one side of the first glass close to the edge of the first glass and close to the edge of the color filter substrate 500.

In some embodiments, the color filter substrate 500 further includes a first glass located in the display area and the non-display area. The first glass supports the color photo-resists and the light-shielding units. The first recess 510, the second recess 520, and the third recesses 530 are all disposed on the first glass. The first glass facilitates a manufacturing process of recesses. of the recess. The manufacturing process of recesses is simple and has low cost.

S400, providing an edge cover material adhesive 710, wherein the edge cover material adhesive 710 includes an edge cover adhesive 700 and a release film 720 disposed on the edge cover adhesive 700, and the release film 720 exposes a first end portion 701 of the edge cover adhesive 700, please refer to 11B.

In some embodiments, the release film 720 does not cover the first end 701 of the edge cover adhesive 700, and the first end 701 with adhesion can be disposed in the first recess 510 in subsequent steps.

In some embodiments, the step S400 includes following steps: S410, providing the edge cover material adhesive 710, wherein the edge cover material adhesive 710 includes the edge cover adhesive 700 and the release film 720 disposed on the edge cover adhesive 700, and the release film 720 exposes the first end 701 of the edge cover adhesive 700.

S420, performing a patterning process on the first end 701 of the edge cover material adhesive 710.

In some embodiments, the patterning process performed in step S420 may correspond to the manufacturing process of recesses in the step S300. For example, corresponding to a shape of the first recess 510.

Figure 11C:
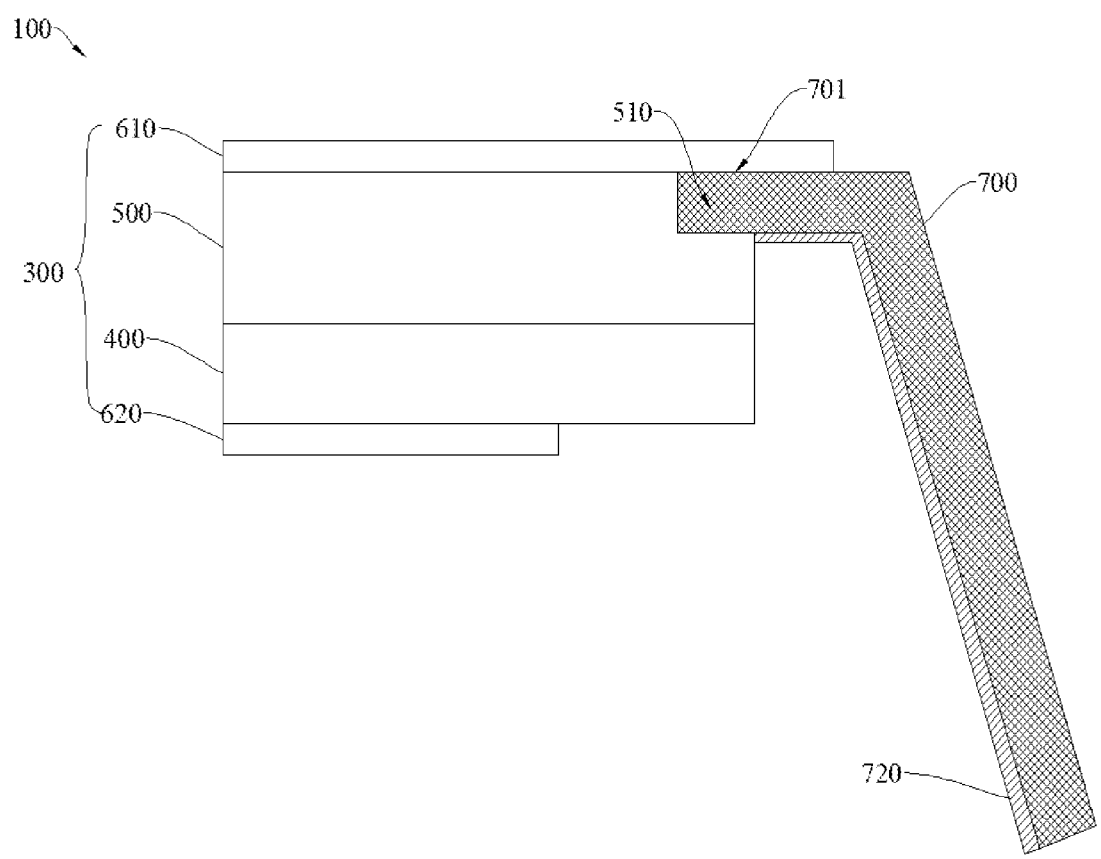

S500, attaching the exposed first end 701 of the edge cover material adhesive 710 in an interior of the first recess 510, please refer to FIG. 11C.

S600, forming a first polarizing layer 610 on the color filter substrate 500 and the edge cover adhesive 700, please refer to FIG. 11C.

In some embodiments, along the top view direction of the display device 100, the first polarizing layer 610 overlaps the color filter substrate 500. The first polarizing layer 610 extends to the edge of the color filter substrate 500. The edge of the first polarizing layer 610 overlaps the edge of the color filter substrate 500. The first polarizing layer 610 has a light-polarizing function. Also, the first polarizing layer 601 can fully contact with the edge cover adhesive 700 in the first recess 510, thereby increasing a contact area between the edge cover adhesive 700 and the first polarizing layer 61. Therefore, adhesion between the edge cover adhesive 700 and the first polarizing layer 610 can be increased, risk of the edge cover adhesive 700 being extruded out is reduced, protective performance of the edge cover adhesive 700 is enhanced, light leakage of the display device 100 is reduced, and a lifespan of the display device 100 is extended.

Figure 11D:
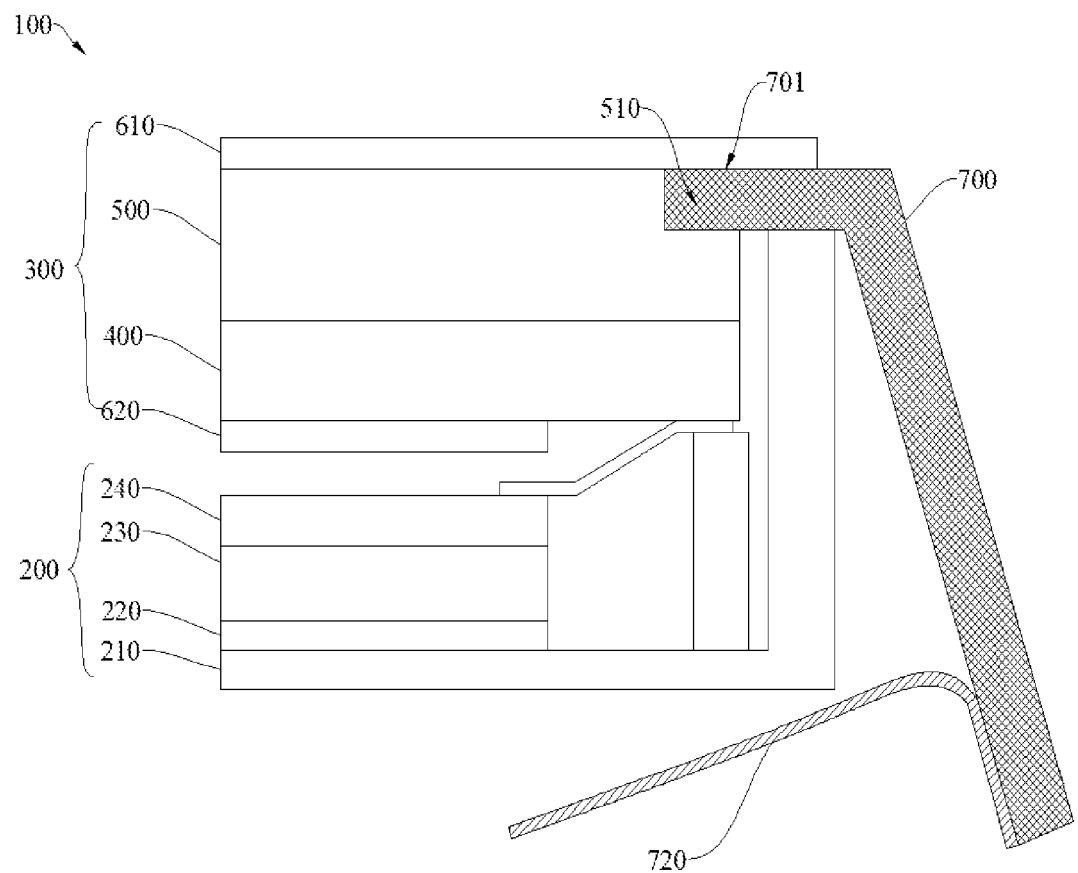

S700, forming a backlight module 200 on a side of the array substrate 400 away from the first polarizing layer 610, please refer to FIG. 11D.

In some embodiments, step S700 includes:

S710, forming the backlight module 200 having a back frame 210 having a containing cavity 211 on the side of the array substrate 400 away from the first polarizing layer 610.

In some embodiments, please refer to FIG. 3, the array substrate 400 and the color filter substrate 500 are both embedded into the containing cavity 211. The display panel 300 includes the array substrate 400 and the color filter substrate 500. The display panel 300 further includes a liquid crystal layer located between the color filter substrate 500 and the array substrate 400, and a second polarizing layer 620 disposed on a side of the liquid crystal layer away from the first polarizing layer 610. The display panel 300 is embedded into the containing cavity 211.

S800, removing the release film 720, please refer to FIG. 11D.

In some embodiments, the release film 720 can protect the edge cover adhesive 700 before being removed, thereby preventing the edge cover adhesive 700 from adhering to other film layers, and ensuring adhesion of the edge cover adhesive 700.

S900, attaching the edge cover adhesive 700 to a periphery of the backlight module 200, please refer to FIG. 3.

In some embodiments, please refer to FIG. 3, the edge cover adhesive 700 is attached to the back frame 210. The first polarizing layer 610 is overlappingly connected to the edge cover adhesive 700 and the back frame 210.

The first polarizing layer 610 extends to the edge of the display device 100, and is overlappingly connected to the back frame 210 and the edge encapsulation 700, thereby further increasing a contact area between the edge cover adhesive 700 and the first polarizing layer 610. Therefore, risk of the edge cover adhesive being warped is reduced, protective performance of the edge cover adhesive 700 is enhanced, light leakage of the display device 100 is reduced, and a lifespan of the display device 100 is extended.

In the present disclosure, an edge cover adhesive is attached to an interior of a first recess on an edge of a color filter substrate. The edge cover adhesive is compressed by the color filter substrate and a first polarizing layer, thereby reducing risk of the edge cover adhesive being warped. As such, protective performance of the edge cover adhesive is improved, light leakage of display devices is reduced, and a lifespan of the display devices is extended.

Embodiments of the present disclosure provide a display device and a manufacturing method thereof. The display device includes a backlight module, a display panel, an edge cover adhesive attached to a periphery of the backlight module and extending to a surface of a side of the display panel away from the backlight module. The display panel includes an array substrate, a color filter substrate, and a first polarizing layer disposed on the color filter substrate. The color filter substrate includes a first recess formed on at least one side of the color filter substrate close to an edge of the color filter substrate and away from the array substrate. A first end portion of the edge cover adhesive is disposed in the first recess. The first polarizing layer covers at least part of the edge cover adhesive. In the present disclosure, the edge cover adhesive is attached to an interior of the first recess on the edge of the color filter substrate. The edge cover adhesive is compressed by the color filter substrate and the first polarizing layer, thereby reducing risk of the edge cover adhesive being warped. As such, protective performance of the edge cover adhesive is improved, light leakage of the display device is reduced, and a lifespan of the display device is extended.

In summary, many changes and modifications to the described embodiment can be carried out by those skilled in the art, and all such changes and modifications are intended to be included within the scope of the appended claims.

What is claimed is:

1. A display device, comprising:
    a backlight module;
    a display panel disposed on the backlight module, wherein the display panel comprises an array substrate, a color filter substrate disposed on a side of the array substrate away from the backlight module, and a first polarizing layer disposed on the color filter substrate; and
    an edge cover adhesive attached to a periphery of the backlight module and extending to a surface of a side of the display panel away from the backlight module;
    wherein the color filter substrate comprises a first recess defined on at least one side of the color filter substrate close to an edge of the color filter substrate and away from the array substrate, a first end portion of the edge cover adhesive is disposed in the first recess, and the first polarizing layer covers at least part of the edge cover adhesive.

2. The display device of claim 1, wherein the first polarizing layer overlaps the color filter substrate along a top view direction of the display device.

3. The display device of claim 1, wherein the backlight module comprises a back frame comprising a containing cavity, and the display panel is embedded into the containing cavity; and
    wherein the edge cover adhesive is attached to the back frame, and the first polarizing layer is overlappingly connected to the edge cover adhesive and the back frame.

4. The display device of claim 1, wherein along a direction from an edge of the color filter substrate to a center of the color filter substrate, a depth of the first recess is increasingly increased, and a thickness of the edge cover adhesive is increasingly increased.

5. The display device of claim 1, wherein the color filter substrate comprises a second recess defined on a side of the color filter substrate away from an edge of the color filter substrate, a depth of the second recess is greater than a depth of the first recess, the first recess is communicatively connected to the second recess, and the edge cover adhesive is filled in the first recess and the second recess.

6. The display device of claim 1, wherein the color filter substrate comprises a plurality of third recesses defined in the first recess, and a protrusion is formed between two adjacent third recesses.

7. The display device of claim 6, wherein the edge cover adhesive is filled in the first recess and the third recesses.

8. The display device of claim 1, wherein along a top view direction of the display device and along a direction from an edge of the color filter substrate to a center of the color filter substrate, the first recess at least comprises a first part having an increasingly increased opening size, and the edge cover adhesive is filled in the first part.

9. A method of manufacturing a display device, comprising following steps:
    providing an array substrate;
    forming a color filter substrate on the array substrate;
    forming a first recess on at least one side of the color filter substrate close to an edge of the color filter substrate and away from the array substrate;
    providing an edge cover material adhesive, wherein the edge cover material adhesive comprises an edge cover adhesive and a release film disposed on the edge cover adhesive, and the release film exposes a first end portion of the edge cover adhesive;
    attaching the exposed first end portion of the edge cover material adhesive to an interior of the first recess;
    forming a first polarizing layer on the color filter substrate and the edge cover adhesive;
    forming a backlight module on a side of the array substrate away from the first polarizing layer;
    removing the release film; and
    attaching the edge cover adhesive to a periphery of the backlight module.

10. The method of claim 9, wherein the step of forming the first recess on at least one side of the color filter substrate close to the edge of the color filter substrate and away from the array substrate comprises a following step:
    forming the first recess having an increasing increased depth on at least one side of along a direction from an edge of the color filter substrate to a center of the color filter substrate, the color filter substrate close to the edge of the color filter substrate and away from the array substrate.

11. The method of claim 9, wherein the step of forming the first recess on at least one side of the color filter substrate close to the edge of the color filter substrate and away from the array substrate comprises a following step:

along a direction from an edge of the color filter substrate to a center of the color filter substrate, forming the first recess on at least one side of the color filter substrate close to the edge of the color filter substrate and away from the array substrate, and forming a second recess communicatively connected to the first recess on a side of the color filter substrate away from the edge of the color filter substrate;

wherein a depth of the second recess is greater than a depth of the first recess.

12. The display device of claim 8, wherein along the direction from the edge of the color filter substrate to the center of the color filter substrate, the first recess comprises a second part having an increasingly reduced opening size, the second part is communicatively connected to the first part and is defined on a side of the first part close to an edge of the color filter substrate, and the edge cover adhesive is filled in the first part and the second part.

13. The display device of claim 1, wherein the edge cover adhesive comprises a first bonding layer, a main body layer disposed on the first bonding layer, a second bonding layer disposed on the main body layer, and a functional layer disposed on the second bonding layer.

14. The method of claim 9, wherein the step of forming the backlight module on the side of the array substrate away from the first polarizing layer comprises a following step:

forming the backlight module having a back frame having a containing cavity on a side of the array substrate away from the first polarizing layer; and wherein the edge cover adhesive is attached to the back frame, and the first polarizing layer is overlappingly connected to the edge cover adhesive and the back frame.

15. The method of claim 9, wherein the first polarizing layer overlaps the color filter substrate along a top view direction of the display device.

16. The method of claim 9, wherein the step of forming the first recess on at least one side of the color filter substrate close to the edge of the color filter substrate and away from the array substrate comprises a following step:

along a direction from an edge of the color filter substrate to a center of the color filter substrate, forming the first recess on at least one side of the color filter substrate close to the edge of the color filter substrate and away from the array substrate, and forming a plurality of third recesses in the first recess, wherein a protrusion is formed between two adjacent third recesses.

17. The method of claim 16, wherein the edge cover adhesive is filled in the first recess and the third recesses.

18. The method of claim 9, wherein the step of forming the first recess on at least one side of the color filter substrate close to the edge of the color filter substrate and away from the array substrate comprises a following step:

along a top view direction of the display device, along a direction from an edge of the color filter substrate to a center of the color filter substrate, forming the first recess having a first part having an increasingly increased opening size on at least one side of the color filter substrate close to the edge of the color filter substrate and away from the array substrate;

wherein the edge cover adhesive is filled in the first part.

19. The method of claim 9, wherein the step of forming the first recess on at least one side of the color filter substrate close to the edge of the color filter substrate and away from the array substrate comprises a following step:

along a top view direction of the display device, along a direction from an edge of the color filter substrate to a center of the color filter substrate, forming the first recess having a first part having an increasingly increased opening size and a second part having an increasingly reduced opening size on at least one side of the color filter substrate close to the edge of the color filter substrate and away from the array substrate, wherein the first part is communicatively connected to the first part; and wherein the second part is disposed on a side of the first part close to the edge of the color filter substrate, and the edge cover adhesive is filled in the first part and the second part.

20. The method of claim 9, wherein the edge cover adhesive comprises a first bonding layer, a main body layer disposed in the first bonding layer, a second bonding layer disposed in the main body layer, and a functional layer disposed on the second bonding layer.

* * * * *